United States Patent
Fox et al.

(10) Patent No.: US 9,071,476 B2
(45) Date of Patent: Jun. 30, 2015

(54) METHODS AND SYSTEMS FOR HIGH BANDWIDTH CHIP-TO-CHIP COMMUNICATIONS INTERFACE

(71) Applicant: Kandou Labs, SA, Lausanne (CH)

(72) Inventors: John Fox, Kislingbury (GB); Brian Holden, Monte Sereno, CA (US); Ali Hormati, Chavannes-pres-Renens (CH); Peter Hunt, Northampton (GB); John D. Keay, Bedford (GB); Amin Shokrollahi, Preverenges (CH); Richard Simpson, Bedford (GB); Anant Singh, Pully (CH); Andrew Kevin John Stewart, Astcote (GB); Giuseppe Surace, Northampton (GB); Roger Ulrich, Bern (CH)

(73) Assignee: KANDOU LABS, S.A. (CH)

( * ) Notice: Subject to any disclaimer, the term of this patent is extended or adjusted under 35 U.S.C. 154(b) by 0 days.

(21) Appl. No.: 14/199,960

(22) Filed: Mar. 6, 2014

(65) Prior Publication Data
US 2014/0254642 A1    Sep. 11, 2014

Related U.S. Application Data

(60) Provisional application No. 61/773,709, filed on Mar. 6, 2013.

(51) Int. Cl.
*H03K 9/00* (2006.01)
*H04L 25/02* (2006.01)

(52) U.S. Cl.
CPC .......... *H04L 25/028* (2013.01); *H04L 25/0292* (2013.01)

(58) Field of Classification Search
CPC .............. H04B 1/00; H04B 3/00; H04B 7/00; H04B 14/00; H04B 17/00; H04B 2001/00; H04L 1/00; H04L 5/00; H04L 7/00; H04L 25/00; H04L 27/00; H04L 2001/00; H04L 2007/00; H04L 2025/00; H03M 5/00
See application file for complete search history.

(56) References Cited

U.S. PATENT DOCUMENTS

| | | | |
|---|---|---|---|
| 6,278,740 B1 | 8/2001 | Nordyke | |
| 8,539,319 B2 | 9/2013 | Chronie | |
| 8,649,445 B2 | 2/2014 | Chronie | |
| 8,880,783 B2 | 11/2014 | Chronie | |

(Continued)

FOREIGN PATENT DOCUMENTS

| | | |
|---|---|---|
| JP | 2003163612 | 6/2003 |
| WO | 2009084121 | 7/2009 |
| WO | 2011119359 | 9/2011 |

OTHER PUBLICATIONS

International Search Report and Written Opinion for PCT/US2014/015840 mailed May 20, 2014.

(Continued)

*Primary Examiner* — Adolf Dsouza
(74) *Attorney, Agent, or Firm* — Invention Mine LLC

(57) ABSTRACT

Systems and methods are described for transmitting data over physical channels to provide a high bandwidth, low latency interface between integrated circuit chips with low power utilization. Communication is performed using group signaling over multiple wires using a vector signaling code, where each wire carries a low-swing signal that may take on more than two signal values.

10 Claims, 6 Drawing Sheets

(56) References Cited

U.S. PATENT DOCUMENTS

| | | |
|---|---|---|
| 2004/0057525 A1 | 3/2004 | Rajan |
| 2007/0260965 A1 | 11/2007 | Schmidt |
| 2008/0200128 A1* | 8/2008 | Hemon ........................ 455/66.1 |
| 2009/0154604 A1 | 6/2009 | Lee et al. |
| 2010/0104047 A1 | 4/2010 | Chen |
| 2011/0268225 A1 | 11/2011 | Chronie |
| 2011/0302478 A1 | 12/2011 | Cronie |
| 2013/0010892 A1 | 1/2013 | Cronie |
| 2014/0016724 A1* | 1/2014 | Cronie et al. ................. 375/296 |
| 2014/0198837 A1 | 7/2014 | Fox |
| 2014/0226734 A1 | 8/2014 | Fox |

OTHER PUBLICATIONS

International Search Report and Written Opinion from PCT/US2014/034220 mailed on Aug. 21, 2014.

\* cited by examiner

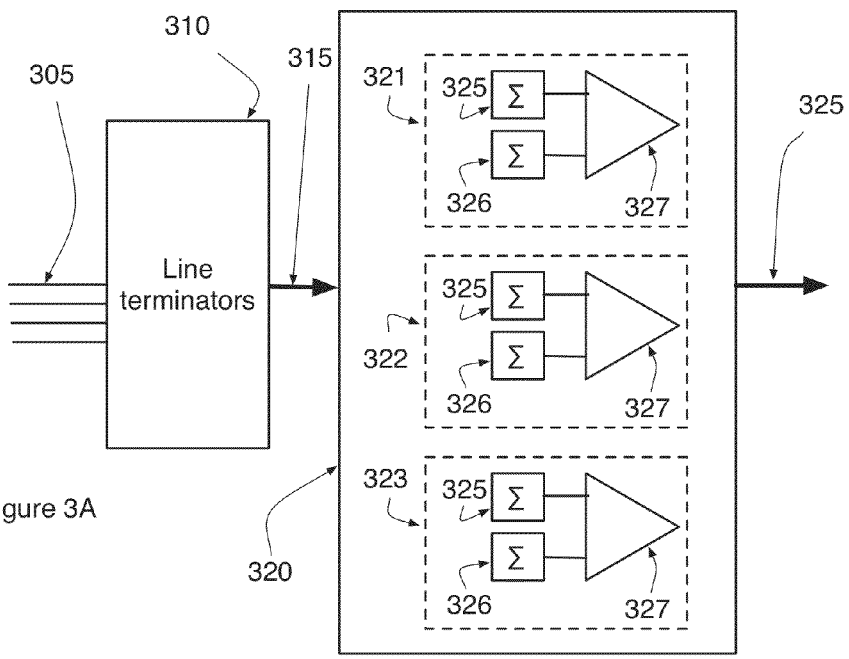
Figure 3A
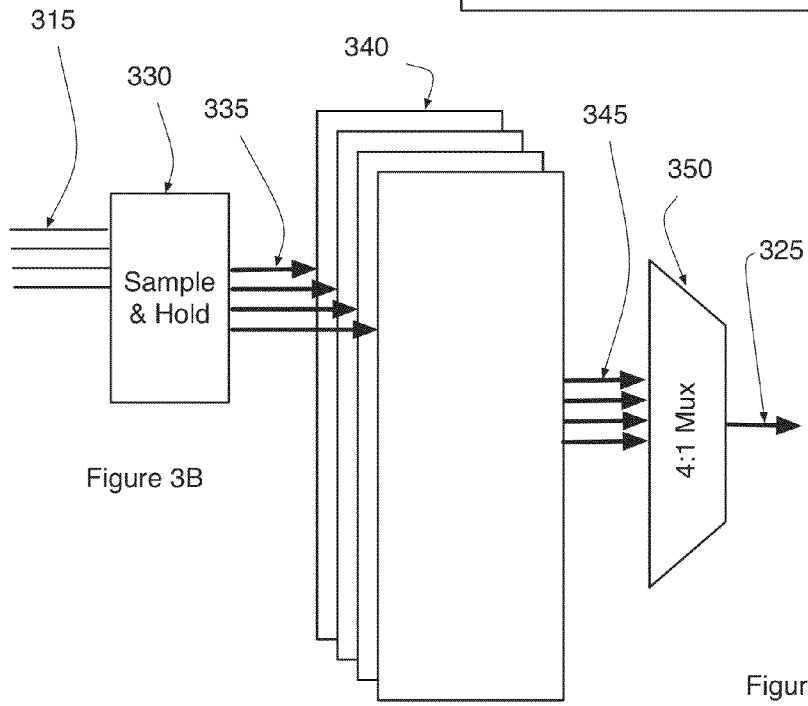
Figure 3B
Figure 3

| Transmit value | Wire 1 | Wire 2 | Wire 3 | Wire 4 | (Wire1+Wire2) > (Wire3+Wire4) | (Wire1+Wire3) > (Wire2+Wire4) | (Wire1+Wire4) > (Wire2+Wire3) | Receive Word |
|---|---|---|---|---|---|---|---|---|
| 7 | 1 | -1/3 | -1/3 | -1/3 | + | + | + | 111 |
| 4 | -1/3 | 1 | -1/3 | -1/3 | + | - | - | 100 |
| 2 | -1/3 | -1/3 | 1 | -1/3 | - | + | - | 010 |
| 1 | -1/3 | -1/3 | -1/3 | 1 | - | - | + | 001 |
| 0 | -1 | 1/3 | 1/3 | 1/3 | - | - | - | 000 |
| 3 | 1/3 | -1 | 1/3 | 1/3 | - | + | + | 011 |
| 5 | 1/3 | 1/3 | -1 | 1/3 | + | - | + | 101 |
| 6 | 1/3 | 1/3 | 1/3 | -1 | + | + | - | 110 |

Figure 4

METHODS AND SYSTEMS FOR HIGH BANDWIDTH CHIP-TO-CHIP COMMUNICATIONS INTERFACE

CROSS REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Pat. No. 8,539,318 issued Sep. 17, 2013 of application Ser. No. 12/982,777 filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. Pat. No. 8,649,445 issued Feb. 14, 2014 of application Ser. No. 13/030,027 filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III");

U.S. patent application Ser. No. 13/842,740, filed Mar. 15, 2013, naming Brian Holden, Amin Shokrollahi, and Anant Singh, entitled "Methods and Systems for Skew Tolerance in and Advanced Detectors for Vector Signaling Codes for Chip-to-Chip Communication" (herein "Holden I");

U.S. patent application Ser. No. 14/158,452, filed Jan. 17, 2014, naming John Fox, Brian Holden, Peter Hunt, John D Keay, Amin Shokrollahi, Richard Simpson, Anant Singh, Andrew Kevin John Stewart, and Giuseppe Surace, entitled "Methods and Systems for Chip-to-chip Communication with Reduced Simultaneous Switching Noise" (hereinafter called "Fox I"); and U.S. patent application Ser. No. 14/178,051, filed Feb. 11, 2014, naming John Fox, Brian Holden, Peter Hunt, John D Keay, Amin Shokrollahi, Richard Simpson, Andrew Kevin John Stewart, Giuseppe Surace, and Roger Ulrich, entitled "Methods and Systems for High Bandwidth Chip-to-Chip Communications Interface" (hereinafter called "Fox II").

BACKGROUND

In communication systems, information may be transmitted from one physical location to another. Furthermore, it is typically desirable that the transport of this information is reliable, is fast and consumes a minimal amount of resources. One of the most common information transfer media is the serial communications link, which may be based on a single wire circuit relative to ground or other common reference, multiple such circuits relative to ground or other common reference, or multiple circuits used in relation to each other.

In the general case, a serial communications link is used over multiple time periods and in each such time period, a signal or signals over the link represent, and thus convey, some amount of information, typically measured in bits. Thus, at a high level, a serial communications link connects a transmitter to a receiver and the transmitter transmits a signal or signals each time period, the receiver receives the signal or signals (or at least something close, as noise and other effects might keep the received signal from being identical to the sent signal). The information being conveyed by the transmitter is "consumed" by the transmitter, and representative signals are generated. The receiver attempts to determine the conveyed information from the signals it receives. In the absence of overall errors, the receiver can output exactly the bits that were consumed by the transmitter.

The optimum design of a serial communications link often depends on the application for which it is used. In many cases, there are trade-offs between various performance metrics, such as bandwidth (number of bits that can be conveyed per unit time and/or per period), pin efficiency (number of bits or bit equivalents that can be conveyed at one time divided by the number of wires required for that conveyance), power consumption (units of energy consumed by the transmitter, signal logic, receiver, etc. per bit conveyed), SSO resilience and cross-talk resilience, and expected error rate.

An example of a serial communications link is a differential signaling (DS) link. Differential signaling operates by sending a signal on one wire and the opposite of that signal on a paired wire; the signal information is represented by the difference between the wires rather than their absolute values relative to ground or other fixed reference. Differential signaling enhances the recoverability of the original signal at the receiver, over single ended signaling (SES), by cancelling crosstalk and other common-mode noise. There are a number of signaling methods that maintain the desirable properties of DS while increasing pin-efficiency over DS. Many of these attempts operate on more than two wires simultaneously, using binary signals on each wire, but mapping information in groups of bits.

Vector signaling is a method of signaling. With vector signaling, pluralities of signals on a plurality of wires are considered collectively although each of the plurality of signals may be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector may refer to the number of degrees of freedom of signals on the plurality of wires instead of the number of wires in the plurality of wires.

With binary vector signaling, each component takes on a coordinate value (or "coordinate", for short) that is one of two possible values. As an example, eight SES wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. A "binary vector signaling code" refers to a mapping and/or set of rules to map information bits to binary vectors. In the example of eight SES wires, where each component has a degree of freedom allowing it to be either of the two possible coordinates, the number of code words in the collection of code words is 2^8, or 256.

With non-binary vector signaling, each component has a coordinate value that is a selection from a set of more than two possible values. A "non-binary vector signaling code" refers to a mapping and/or set of rules to map information bits to non-binary vectors.

Vector signaling codes may be created based on particular design requirements, also known as constraints, which must be satisfied by each codeword. As one example, a vector signaling code is said to be "balanced", if all coordinate values of each codeword sum to a constant, typically zero.

Examples of vector signaling methods are described in Cronie I, Cronie II, Cronie III, Fox I and Fox II.

BRIEF SUMMARY

A transmitter and receiver can communicate using a serial communications link, wherein the serial communications link uses signaling that is vector signaling, balanced and can be detected using a plurality of comparators having inputs coupled to differing combinations of sums of components of a vector signal.

The number of components can be four, or more or less than four. The number of coordinate values for a component can be four, or more or less than four. For example, a link might use four components with four possible coordinate values, a high value, a low value, and inverses of the high and low values, such that a signal having the high value cancels out three signals having the inverse of the low value and a signal having the inverse of the high value cancels out three signals having the low value and, in this manner, the link can convey three bits in a signal period using those four components by mapping the eight possible three bit combinations onto the eight vector code words represented by the four permutations of one high value and three inverses of the low value plus the four permutations of the inverse of one high value and three low values. In a more specific embodiment, the high and low values are voltage values and relative to a reference, the high value and its inverse have the same magnitude but opposite signs, the low value and its inverse have the same magnitude but opposite signs, and the high value has a magnitude three times the low value.

In a receiver, some number of comparators compares sums of signals. In a specific embodiment, there are three comparators, each which compares a sum of two of the received signals and collectively the output of the three comparators corresponds to the three bits encoded by the signals.

In accordance with at least one embodiment of the invention, processes and apparatuses provide for transmitting data over physical channels to provide a high speed, low latency interface providing high total bandwidth at low power utilization, such as to interconnect integrated circuit chips in a multi-chip system. In some embodiments, different voltage, current, etc. levels are used for signaling and more than two levels may be used, such as a ternary vector signaling code wherein each wire signal has one of three values.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description and the included drawings.

BRIEF DESCRIPTION OF THE DRAWINGS

Various embodiments in accordance with the present disclosure will be described with reference to the drawings. Same numbers are used throughout the disclosure and figures to reference like components and features.

FIG. 3 is a block diagram for the receiver and H4 decoder components of the FIG. 1 system, in accordance with at least one embodiment of the invention.

FIG. 4 is a table describing one example mapping of transmit values to H4 code words such that three multi-input comparators directly output receive words without need of an explicit decoder function.

DETAILED DESCRIPTION

Figure 1:
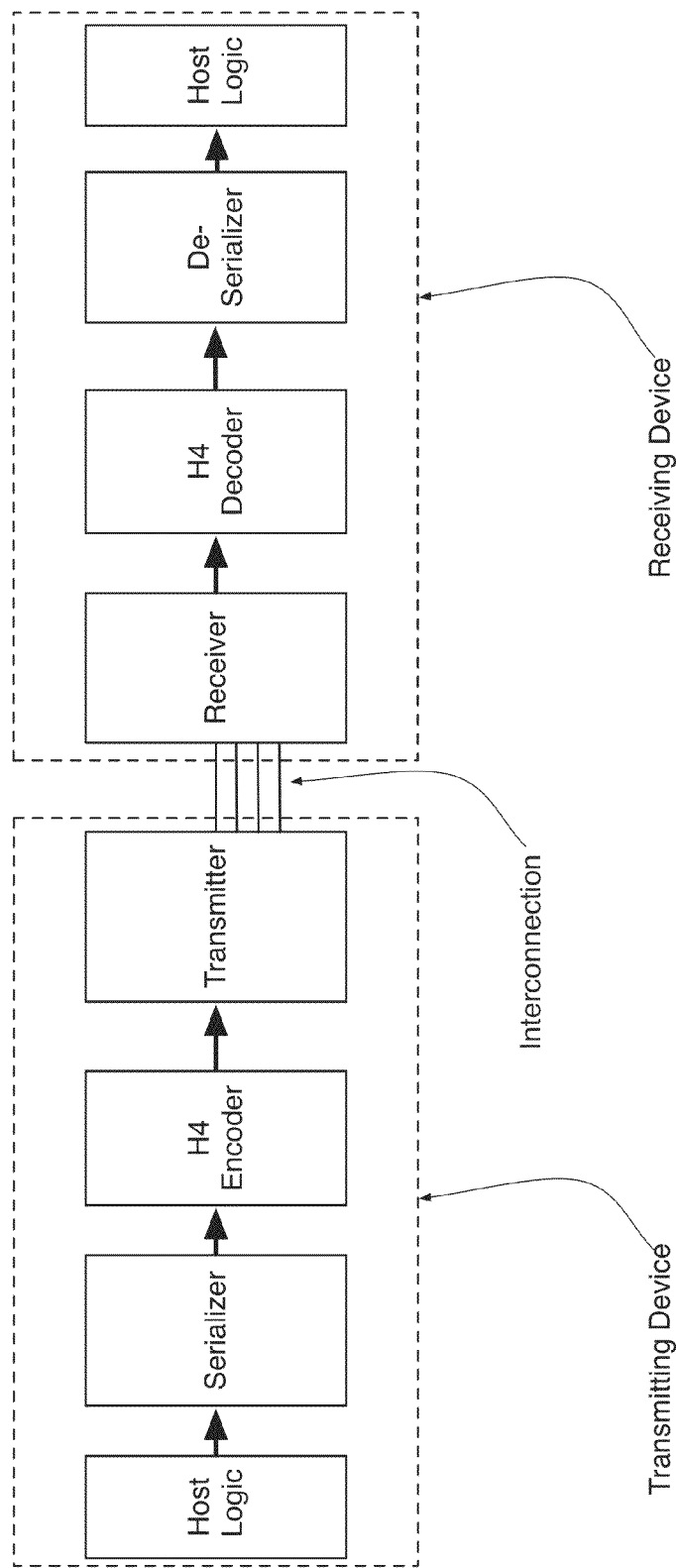
FIG. 1 is a block diagram of an example system comprising a transmitting device, interconnection, and receiving device, in accordance with at least one embodiment of the invention.

Despite the increasing technological ability to integrate entire systems into a single integrated circuit, multiple chip systems and subsystems retain significant advantages. The physical infrastructure to support high-bandwidth chip-to-chip connectivity is available, if the power, complexity, and other circuit implementation issues for such interfaces could be resolved.

For purposes of description and without limitation, example embodiments of at least some aspects of the invention herein described assume a systems environment of (1) at least one point-to-point communications interface connecting two integrated circuit chips representing a transmitter and a receiver, (2) wherein the communications interface is supported by an interconnection group of four microstrip line signal wires providing low to medium loss connectivity, e.g., less than 15 dB at 4 GHz (8 Gbps), without excessive ripple loss characteristics or reflections, (3) with a signaling rate of 8 GigaSymbols/second, delivering an aggregate throughput of 24 gigabytes/sec, and (4) having a combined power consumption for the active transmitter and receiver of said communications interface of 180 milliwatts in a medium range process technology node, such a general-purpose 55 nm integrated circuit process.

As subsequently described, at least one embodiment of the invention uses reduced-swing current mode logic pin drivers and interconnection wiring terminated at both transmitter and receiver.

Without loss of generality, the physical interface between devices is herein described as having point-to-point wire connections between integrated circuit devices using microstrip line traces over a ground plane. As one example, four parallel microstrip lines are used having a trace width of 150 µm, spaced as two pairs of lines separated by 200 µm, with spacing between pairs of 600 µm and overall signal path length of 50 mm. The substrate is FR4, with a thickness of 420 µm, ground plane thickness is 35 µm, and microstrip lines thickness of 17.5 µm, and both ground plane and microstrip line materials are copper.

Example signal levels described in this document are provided for purposes of explanation, and are not limiting. Other embodiments of the invention may utilize different signaling levels, connection topology, termination methods, and/or other physical interfaces, including optical, inductive, capacitive, or electrical interconnection. Similarly, examples based on unidirectional communication from transmitter to receiver are presented for clarity of description; combined transmitter-receiver embodiments and bidirectional communication embodiments are also explicitly in accordance with the invention.

Assumptions

For purposes of description and without limitation, example embodiments of at least some aspects of the invention further assume the following characteristics unless otherwise stated:

Technology: TSMC 55 nm or equivalent medium range process
Vdd=1.1 V
SERDES interface:
   CDR
   PLL clock recovery/regeneration
   Symbol rate of 8 GSymbols/sec
   24 Gb/s total throughput per four wires
   4:1 mux architecture
   100 Ohm differential channel impedance with loss ~−15 dB at 4 GHz (8 Gbps)

FIG. 1 shows a general block diagram of an interconnection in accordance with at least one embodiment of the invention, having a transmitting device, inter-device interconnection, and a receiving device.

H4 Code

As used herein, "H4" code refers to a vector coding method and logic wherein a transmitter consumes three bits and outputs signals on four wires in each symbol period, as previously described in Cronie I. In a parallel configuration, more than one group is present, with each group comprising four wires communicating three bits per symbol period and an H4 encoder and an H4 decoder per group. With an H4 code, there are four signal wires and four possible coordinate values, represented herein as $+1$, $+\frac{1}{3}$, $-\frac{1}{3}$, and $-1$. The H4 code words are balanced, in the each code word is either one of the four permutations of $(+1, -\frac{1}{3}, -\frac{1}{3}, -\frac{1}{3})$ or one of the four permutations of $(-1, +\frac{1}{3}, +\frac{1}{3}, +\frac{1}{3})$.

In a specific embodiment, a $+1$ might be sent as a signal using an offset of 200 mV, while a $-1$ is sent as a signal using an offset of $-200$ mV, a $+\frac{1}{3}$ is sent as a signal using an offset of 66 mV, and a $-\frac{1}{3}$ is sent as a signal using an offset of $-66$ mV, wherein the offset voltage levels are with respect to a fixed baseline or reference level present on each of the signal wires, such as $+300$ mV. Note that the average of all of the signals in each case represents an offset of "0" (corresponding to the baseline or reference level). There are eight distinct code words in H4, which is sufficient to encode three binary bits per transmitted symbol interval.

Other variants of the H4 coding described above exist as well. The signal levels are given as examples, without limitation, and represent incremental signal values from a nominal reference level.

Encoder and Transmitter

Figure 2:
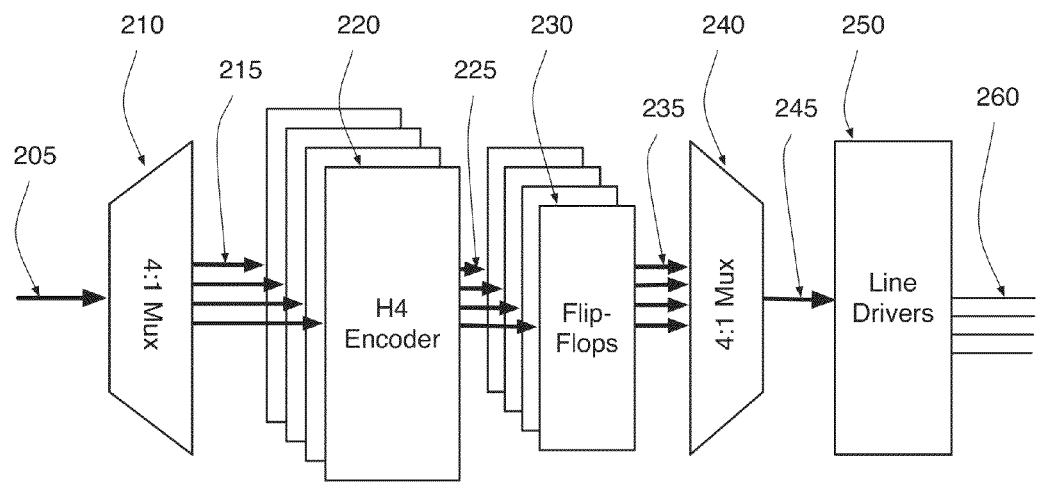
FIG. 2 is a block diagram for the H4 encoder and transmitter components of the FIG. 1 system, in accordance with at least one embodiment of the invention.

FIG. 2 is a block diagram for the H4 encoder and transmitter components of the FIG. 1 system. As an example, FIG. 2 shows a 4 GHz 4:1 mux architecture that supports a line rate of 8 Gsymbols per second. This embodiment uses source- and destination-terminated current mode logic drivers with reduced signal swing and a vector signaling code based on code words of four symbols.

Host data, which may be subjected to scrambling, encryption, or encapsulation beyond the scope of this disclosure, is provided at 205. High-speed communications embodiments often exceed the performance capabilities of a single communications circuit instance. In such cases, it is conventional to utilize multiple processing instances or phases, with FIG. 2 showings one such example. There, four processing phases are used, with each of processing stages 220 and 230 having four distinct instances, each processing the symbol data for one transmission interval. Any number of phases may be used, from a single phase performing all operations, to sixteen or more, and the multiple phases may extend over a greater or lesser portion of the described transmission system than shown in this example.

In one example embodiment, multiplexer 210 sequentially distributes consecutive host data elements to the four encoding phases, and multiplexer 240 sequentially combines the resulting four encoded results into a single data stream for transmission. A second example embodiment accepts host data in twelve bit increments, which is then distributed as four three-bit portions to the four processing phases, and subsequently combined to produce the higher rate transmitted stream. Each H4 encoder 220 maps three bits of user data to one H4 code word, with the results buffered in flip-flops 230. At each symbol interval, one buffered H4 code word is selected, and then converted to the chosen wire signal levels by line drivers 250 for transmission on interconnection 260. This allows for transmission rates to be multiples of the processing rates of a single encoder or decoder.

Receiver and Decoder

The complementary receiver and decoder for the described H4 transmitter system perform a number of operations. The interconnection wires are terminated in a matched impedance, received signal levels corresponding to the symbol representations of the H4 code are measured, symbols interpreted as valid code words of the H4 code, and the detected code words mapped back to received host data. At least one embodiment combines at least some aspects of these receiver and decoder operations for efficiency.

As will be apparent to one familiar with the art, four digital comparators measuring each of the four input wires per group against a fixed reference level (e.g. the baseline voltage) would conventionally be used to identify a four wire code, such as a received H4 codeword. However, such an approach will be affected by common mode noise, requiring additional receive processing to produce a variable reference level compensating for such noise and offset variation. An alternative conventional approach utilizing multiple pairwise comparisons between wires is ineffective with the H4 code because it contains multiple coordinates of the same value, which would result in indeterminate or unstable pairwise comparator outputs.

Holden I teaches that vector signaling codes may be detected by first summing sets of wires together, optionally incorporating input weighing factors, then performing a comparison between two such sums. It further discloses a "multi-input comparator", a circuit element producing a binary decision output based on such an arithmetic "difference of sums" operation. Holden I describes a set of comparators as "detecting" a vector signaling code if the set of comparator outputs uniquely identifies each codeword of that code.

In one embodiment, a single multi-input comparator circuit sums the received signal values on two selected wires, sums the received signal values on the remaining two wires, and outputs a comparison of the two summed results, combining elements of line receiver and H4 code word detection operations. Another embodiment further incorporates line equalization and amplification into the same circuit. As will be obvious to one familiar with the art, alternative embodiments utilizing separate summation, difference, and/or comparison functions are equivalent to the example integrated design.

In accordance with at least one embodiment of the invention as shown in FIG. 3, a receiver detecting the described H4 code uses three multi-input comparators 321, 322, 323 using input weighting factors of one, each such comparator comparing 327 the sum 325 of two selected wires against the sum 326 of the other two wires. The receiver is therefore reference-less, providing good common-mode noise rejection. Moreover, the particular structure of the code and the receiver ensures that only binary values are present at the output of the comparators, with no indeterminate or unstable results.

For some mappings of host data to transmitted H4 code words, a direct relationship between the detected result of the three receive comparators and the receive host data exists, so no additional mapping logic is required at the receiver. In accordance with at least one embodiment of the invention, one such mapping is shown in FIG. 4. Transmit data words having values from 0 to 7 are mapped to H4 code words transmitted on wires 1-4 as illustrated. At the receiver, three comparators perform the operations:

(Wire 1+Wire 2)>(Wire 3+Wire 4)

(Wire 1+Wire 3)>(Wire 2+Wire 4)

(Wire 1+Wire 4)>(Wire 2+Wire 3)

These summations and comparisons produce results which may directly be used as a binary representation of the receive data word. For any particular mapping of signal wires to three receive comparators fully detecting the codewords, and those three comparator outputs to receive data bits, one corresponding mapping of transmit data to H4 codeword exists which allows this receiver simplification.

In the block diagram of FIG. 3A, each receive interconnection line 305 is terminated at 310. In some embodiments, line termination may further incorporate overvoltage protection, DC blocking capacitors, and introduction of a common mode or bias voltage for subsequent processing stages. Terminated receive signals 315 are presented to H4 detection 320 which performs a comparison 327 between sums of input values 325 and 326. In this example, signal wires are mapped to comparator inputs in the order previously described and as shown in FIG. 4, resulting in a direct mapping of comparator outputs to received host data 325 as shown. One embodiment of an apparatus comprises a set of four wires for carrying signals associated with a vector signaling code and a set of three comparator circuits, each comparator circuit connected to all four wires of the set of four wires. Each such comparator circuit of the set of comparator circuits includes two adder circuits, where each adder circuit is connected to an input of the respective two-input comparator. As described above, and as can be seen from inspection of the wire pairings of FIG. 4, each adder circuit is connected to a globally unique pair of wires selected from the set of four wires. That is, each comparator output is generated by processing the signal from all four wires, and each comparator circuit uses a unique pairing of wire inputs. One uses the pairs (1,2) and (3,4); one uses (1,4) and (2,3) and the third uses (1,3) and (2,4), which represent the possible pair-wise combinations of the four wires.

As mentioned, some embodiments use a balanced vector signaling code consisting of four elements, wherein each of the four elements has an amplitude and polarity, and wherein three of the four elements have a same amplitude and polarity, and a fourth element has a different amplitude and an opposite polarity. Another observation that is may be useful to recognize the operation of some embodiments is that the comparison outputs of the set of three comparator circuits identify which of the four wires contains the fourth element and the polarity of the fourth element. And in some embodiments the comparison outputs of the set of three comparator circuits provide a data word output.

As with the described transmitter example, multiple processing phases may be used to allow symbol signaling rates greater than might be supported by a single circuit instance in the available semiconductor technology. FIG. 3B illustrates multi-phase receive processing, with an example four phase embodiment of receive comparator component 320. To show the transparent nature of the multi-phase processing technique, the example portion 320 of FIG. 3A may be replaced by the four phase embodiment of FIG. 3B, retaining common inputs 315 and outputs 325.

As shown in FIG. 3B, terminated receive signals 315 are captured by sample-and-hold 330, providing stable signal levels 335 as inputs to each of the example four processing phases 340. To provide the maximum processing time to each processing phase 340 (which in this example comprises the H4 detection component 321, 322, and 323 of FIG. 3A), one sample-and-hold per line is provided per phase (thus, in this example, sixteen total) with each operating at one quarter the receive symbol rate. Detected results 345 from all phases are combined by multiplexer 350 into a combined received host data stream equivalent to that of FIG. 3A. Other embodiments may incorporate different numbers of phases and/or different numbers of sample-and-hold elements providing different timing constraints.

Figure 5:
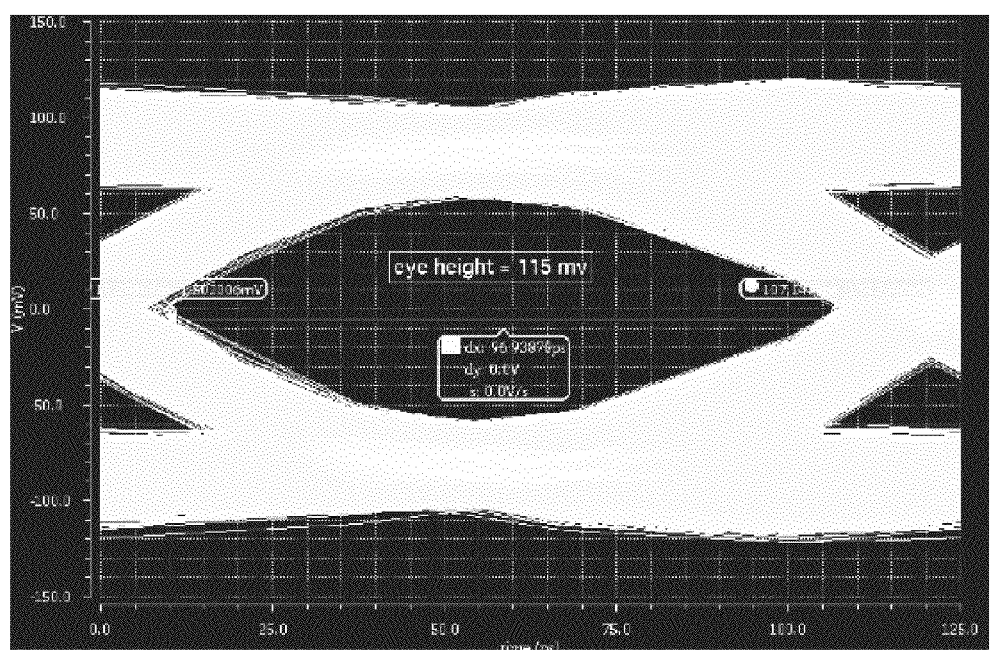
FIG. 5 shows an eye graph of receive signaling in the described H4 encoded system, in accordance with at least one embodiment of the invention.
Figure 6:
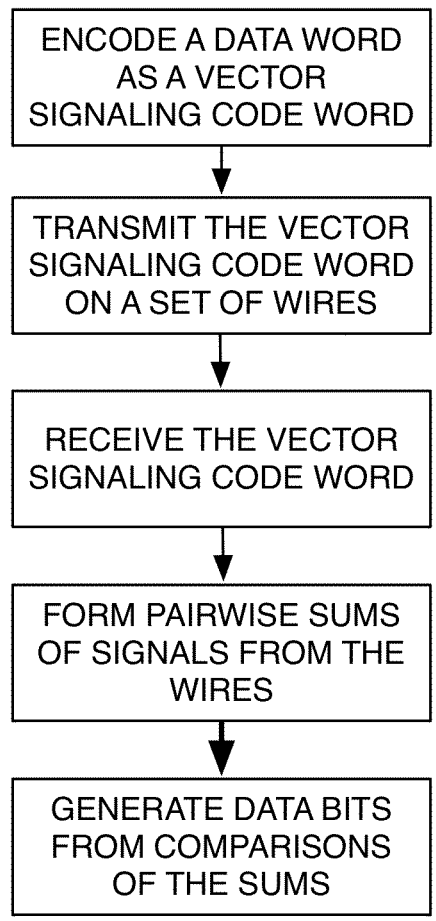
FIG. 6 is a flow chart illustrating a method of transmitting and receiving data in accordance with the invention.

Example eye diagrams for this signaling method are shown in FIG. 5. Voltages are shown as offsets from a baseline reference level. FIG. 6 depicts an example combined transmit and receive method according to one embodiment used by a single device in a full-duplex system, where the method includes both a transmit operation and receive operation. In such a method the transmitted data is sent to a second device, and the receive signals are received from the second device. In the method, the system encodes a data word as a vector signaling code word. The method then includes transmitting the vector signaling code word on a set of wires. In the receive operation of the method, it receives at an integrated circuit device a vector signaling code word comprising symbols selected from an alphabet of three or more values. Then the method detects the at least one vector signaling code word by at least one comparison of a sum of physical signals on two selected wires and a sum of physical signals on a remaining two wires. In some embodiments, each detection comparison represents one bit of a received binary data word corresponding to a transmitted data word, the received binary data word being output for use by the receiving integrated circuit device. Alternative methods may include only the transmit operation, while others may include only the receive operation, as may be utilized in a one-way half-duplex system.

The examples presented herein illustrate the use of vector signaling codes for point-to-point chip-to-chip interconnection. However, this should not been seen in any way as limiting the scope of the described invention. The methods disclosed in this application are equally applicable to other interconnection topologies and other communication media including optical, capacitive, inductive, and wireless communications. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

We claim:

1. A transceiver comprising:
   an interconnection between at least a first and a second integrated circuit device, the interconnection comprising at least one interconnection wire group, wherein each interconnection wire group is a wire group for communicating signals representing a code word of a vector signaling code;
   an encoder that converts a received transmit data word to a transmit code word of a vector signaling code;
   a transmit driver that emits physical signals on wires of the interconnection wire group that correspond to elements of the transmit code word;
   a receiver circuit that detects physical signals on the interconnection wires as elements of a received code word of a vector signaling code comprising a plurality of signal summers each configured to sum physical signals on two selected wires and a plurality of comparators to compare outputs of the signal summers and to generate a decoded output representing a receive data word.

2. The transceiver of claim 1, wherein the vector signaling code is balanced and consists of four elements, wherein each of the four elements has its amplitude and polarity, and wherein three of the four elements have a same amplitude and polarity.

3. The transceiver of claim 2, wherein the vector signaling code is an H4 code.

4. The transceiver of claim 1, further comprising a multiplexer to sequentially select vector code words output from a plurality of encoders for transmission on the interconnection wire group and a sample and hold circuit to sample vector code words on the interconnection wire group for processing by a plurality of receiver circuits.

5. An apparatus comprising:
- a set of four wires for carrying signals associated with a vector signaling code;
- a set of three comparator circuits, each comparator circuit connected to all four wires of the set of four wires, and each comparator circuit having a two-input comparator providing a comparison output;
- each comparator circuit of the set of comparator circuits further comprising two adder circuits, each adder circuit connected to an input of the respective two-input comparator, and each adder circuit is connected to a globally unique pair of wires selected from the set of four wires.

6. The apparatus of claim 5, wherein the vector signaling code is balanced and consists of four elements, wherein each of the four elements has an amplitude and polarity, and wherein three of the four elements have a same amplitude and polarity, and a fourth element has a different amplitude and an opposite polarity.

7. The apparatus of claim 6, wherein the comparison outputs of the set of three comparator circuits provide a data word output.

8. The apparatus of claim 6 wherein the comparison outputs of the set of three comparator circuits identify which of the four wires contains the fourth element and the polarity of the fourth element.

9. A method comprising:
- receiving at an integrated circuit device a vector signaling code word comprising symbols selected from an alphabet of three or more values;
- detecting the at least one vector signaling code word by at least one comparison of a sum of physical signals on two selected wires and a sum of physical signals on a remaining two wires;
- wherein each detection comparison represents one bit of a received binary data word corresponding to a transmitted data word, the received binary data word being output for use by the receiving integrated circuit device.

10. The method of claim 9, wherein the vector signaling code is balanced and consists of four elements, wherein each of the four elements has its amplitude and polarity, and wherein three of the four elements have a same amplitude and polarity.

* * * * *